United States Patent
Omori

(10) Patent No.: US 8,333,530 B2
(45) Date of Patent: Dec. 18, 2012

(54) LATCH DEVICE FOR VEHICLE SEAT

(75) Inventor: Misao Omori, Shioya-gun (JP)

(73) Assignee: TS Tech Co., Ltd., Asaka-Shi, Saitama-Ken (JP)

(*) Notice: Subject to any disclaimer, the term of this patent is extended or adjusted under 35 U.S.C. 154(b) by 539 days.

(21) Appl. No.: 12/088,487

(22) PCT Filed: Sep. 28, 2005

(86) PCT No.: PCT/JP2005/017903
§ 371 (c)(1),
(2), (4) Date: Feb. 22, 2010

(87) PCT Pub. No.: WO2007/037004
PCT Pub. Date: Apr. 5, 2007

(65) Prior Publication Data
US 2010/0143029 A1    Jun. 10, 2010

(51) Int. Cl.
*B60N 2/02* (2006.01)
(52) U.S. Cl. ............... 403/330; 403/322.3; 403/325; 296/65.03; 297/336
(58) Field of Classification Search ........... 403/322.1, 403/322.3, 325, 326, 327, 328, 330; 296/65.03, 296/65.05; 297/336
See application file for complete search history.

(56) References Cited

U.S. PATENT DOCUMENTS

| | | | | |
|---|---|---|---|---|
| 5,722,727 A * | 3/1998 | Unckrich | ...... | 297/336 |
| 6,012,747 A * | 1/2000 | Takamura et al. | ...... | 292/216 |
| 6,945,585 B1 * | 9/2005 | Liu et al. | ...... | 296/65.03 |
| 7,243,974 B2 * | 7/2007 | Kondo et al. | ...... | 296/65.03 |
| 2005/0269854 A1 * | 12/2005 | Lutzka et al. | ...... | 297/378.13 |

FOREIGN PATENT DOCUMENTS

JP    2001310658 A    11/2001

* cited by examiner

*Primary Examiner* — Michael P Ferguson
(74) *Attorney, Agent, or Firm* — Browdy and Neimark, PLLC

(57) ABSTRACT

A latch assembly 5 includes a base plate 10 having a striker groove 11, a latch 12 provided in the base plate 10 and having a striker engaging groove 16, and a ratchet 20 for regulating rotation of the latch 12 in unlatch direction. A looseness eliminating lever 30 is attached to the latch 12 by means of a pin 31 moving around a latch shaft 13, one end of the looseness eliminating lever 30 is provided with a latch holding face 34 and an unlatch face 33 to contact with a post 32 provided at a specified position, the other end of the lever 30 is provided with a spring 14 for biasing the guide face 34 or the sliding face 33 to be always in contact with the post 32, and an apex 35 as a dead center is formed between the guide face 34 and the sliding face 33. The guide face 34 is formed in an arc-shaped inclined surface so as to be remoter from the pin 31 from a start end to a terminal end.

4 Claims, 5 Drawing Sheets

LATCH DEVICE FOR VEHICLE SEAT

TECHNICAL FIELD

The present invention relates to a latch device for fixing, to a car body, a vehicle seat which is detachably mounted on a car body or is rotatably mounted on a car body.

BACKGROUND ART

Conventionally, a latch assembly for engaging and holding a striker by means of a latch and a ratchet was formed in a known configuration in which a rubber damper is provided at the inner side of a striker groove for receiving a striker, and the striker is engaged and held between the rubber damper and the inner circumference of the striker engaging groove of the latch (see, for example, patent documents 1 and 2).

Patent document 1: Japanese UM Publication No. 6-7970
Patent document 2: Japanese UM Laid-Open No. 58-27460

DISCLOSURE OF THE INVENTION

In the known art, the striker is pressed by the rubber damper, and functions to eliminate loosening and to force out (the striker) when unlatching, and therefore when a load more than a flexible rigidity of the damper is applied, the striker deflects the damper and moves, thereby causing looseness of the latch assembly and instability of the seat.

When the load is decreased, the damper is restored elastically, and the striker and the latch return to the original position, thereby generating noise by the latch and ratchet hitting against each other.

On the other hand, the configuration in which the striker is in contact with the damper and is arrested not to move further inward, is difficult to realize because a slight gap may be formed between the engaging groove of the latch and the striker due to a manufacturing or assembling error.

It is hence an object of the invention to provide a latch device of a vehicle seat capable of preventing loosening of a latch assembly, instability of the seat, and generation of noise when the striker and the latch return to the original position.

BEST MODE FOR CARRYING OUT THE INVENTION

Figure 1:
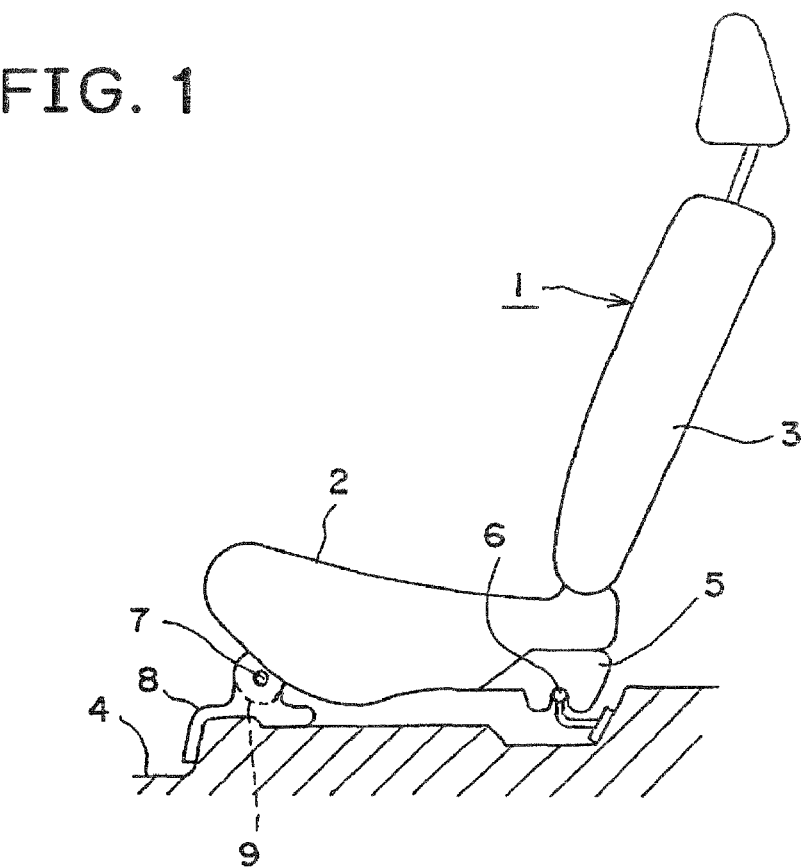
FIG. 1 is a side view of a vehicle seat of the invention.

An example of the invention will be described with reference to the drawings. A vehicle seat 1 has a seat bottom 2 and a backrest 3. The front side of the vehicle seat 1 shown in FIG. 1 is coupled to an engaging part 8 of a car body 4 and an engaging part 9 of the seat 1 by means of a horizontal mounting shaft 7, and the rear side of the vehicle seat 1 is coupled to a striker 6 and a latch assembly 5. By clearing the engagement between the striker 6 and the latch assembly 5, the vehicle seat 1 is released to be rotatable between the position of use and the moving position to and from the horizontal shaft 7. Further, the front side of the vehicle seat 1 may be also coupled to the car body by means of the striker 6 and the latch assembly 5, and the rear side of the vehicle seat 1 may be coupled by means of the horizontal shaft 7.

The present invention also relates to the configuration of the latch assembly 5, and the configuration of the coupling portion not using the latch assembly 5 is not particularly specified. For example, the vehicle seat 1 can be mounted rotatably on the car body 4 by means of a longitudinal shaft, or may be detachably mounted on the car body 4. The coupling means by the latch assembly 5 and the striker 6 may be employed at both front side and rear side of the vehicle seat 1.

Figure 2:
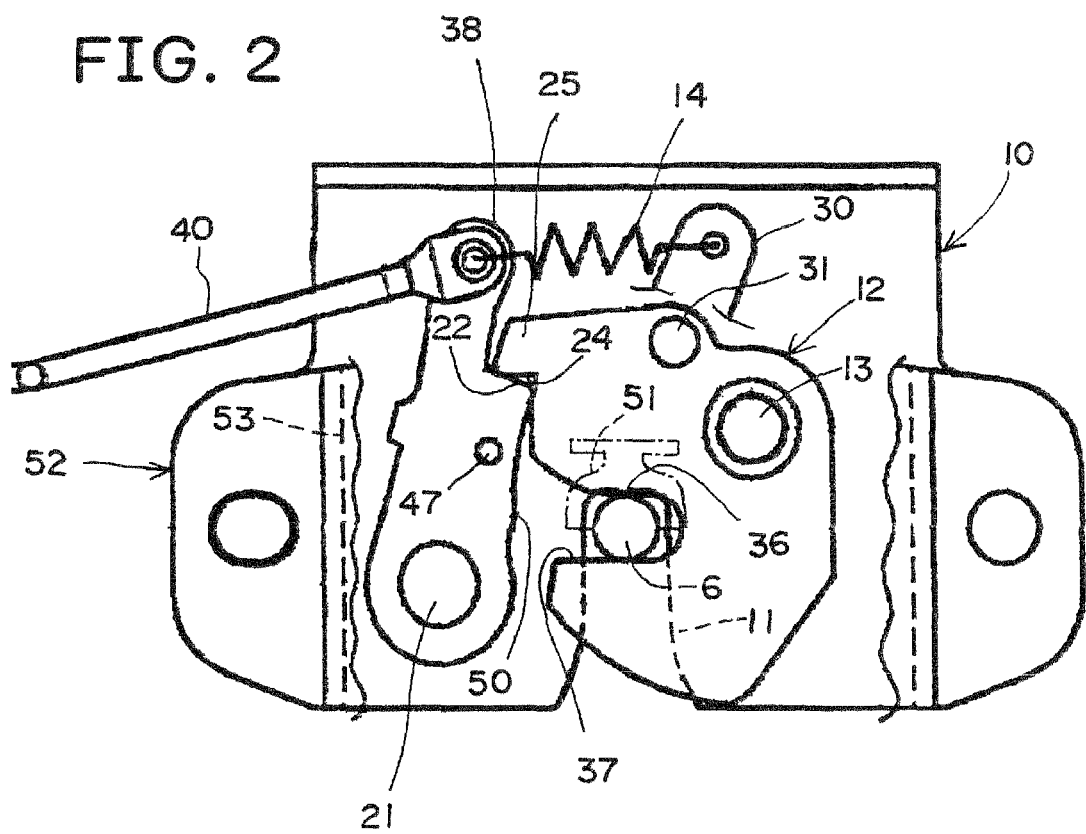
FIG. 2 is a side view of a latched state of a latch assembly.

A base plate 10 of the latch assembly 5 has a longitudinal striker groove 11 for receiving the striker 6. The striker groove 11 as an inverted U-shape, and the lower side thereof is opened to the outside. A latch 12 is rotatably mounted on the base plate 10 by means of a latch shaft 13, and the latch shaft 13 is positioned at the rear side from the striker groove 11. The latch is usually biased in the counterclockwise direction by a spring 14 as shown in FIG. 2.

The latch 12 has a striker engaging groove 16 to be engaged with the striker 6 when the vehicle seat 1 is moved from the moving position to the position of use. The striker 6 abuts against the striker engaging groove 16 at an unlatch position (FIG. 10), thereby rotating the latch 12 in clockwise direction toward a latch position (FIG. 2) by resisting the elastic force of the spring 14.

The base plate 10 has a ratchet 20 mounted rotatably by means of a ratchet shaft 21. The ratchet shaft 21 is positioned at the rear side from the striker groove 11. A leading end 38 of the ratchet 20 is engaged with an end of the spring 14. The ratchet 20 has a pawl 22 for holding the latch 12 at the latch position by engaging with a ratchet engaging face 24 of the latch 12 when the latch 12 is displaced from the unlatch position to the latch position. The pawl 22 is formed in an arc shape centered on the ratchet shaft 21. The ratchet engaging face 24 is formed at the downside of a latch bump 25. The latch bump 25 is formed in a square shape and projects toward the ratchet 20.

The latch 12 is provided with a looseness eliminating lever 30. The looseness eliminating lever 30 is rotatably mounted on the latch 12 by means of a pin 31. The upper end of the lever 30 is coupled to the other end of the spring 14.

Figure 10:
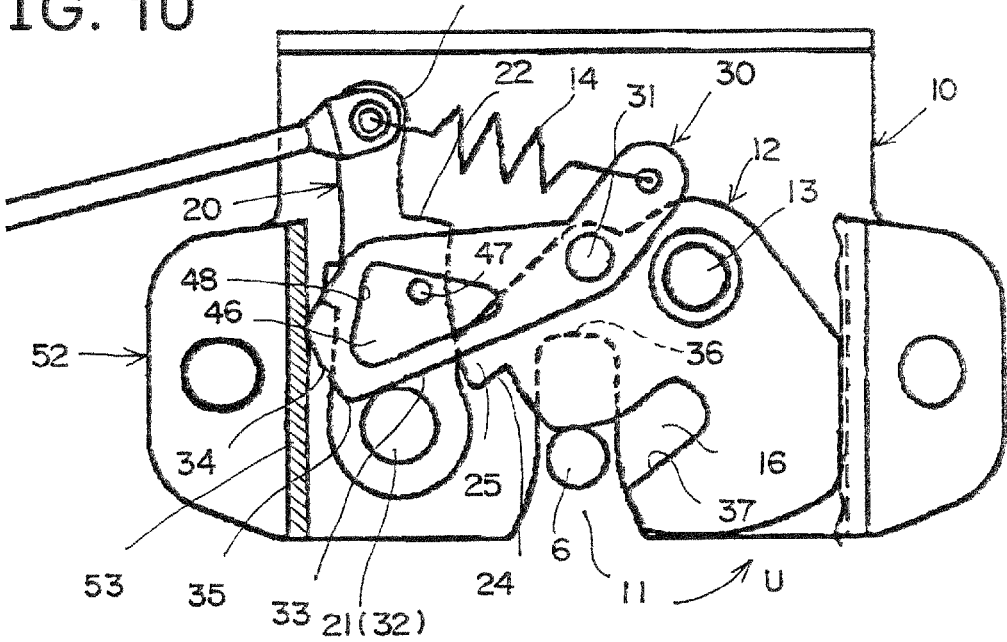
FIG. 10 is a side view of an unlatched state of the latch assembly.
Figure 11:
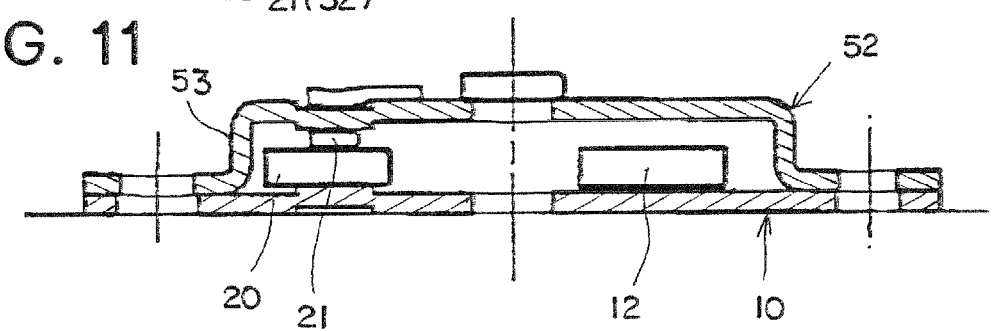
FIG. 11 is a sectional view taken along line A-A in FIG. 9.

The looseness eliminating lever 30 has an unlatch face 33 to come in contact with a post 32 when the latch 12 is at the unlatch position as shown in FIG. 10. In the present example, the ratchet shaft 21 functions also as the post 32. In FIG. 10, the upper part of the lever 30 is biased to the leftward direction by the elastic force of the spring 14, and the latch 12 is biased in an unlatch direction U indirectly by the elastic force of the spring 14.

Figure 4:
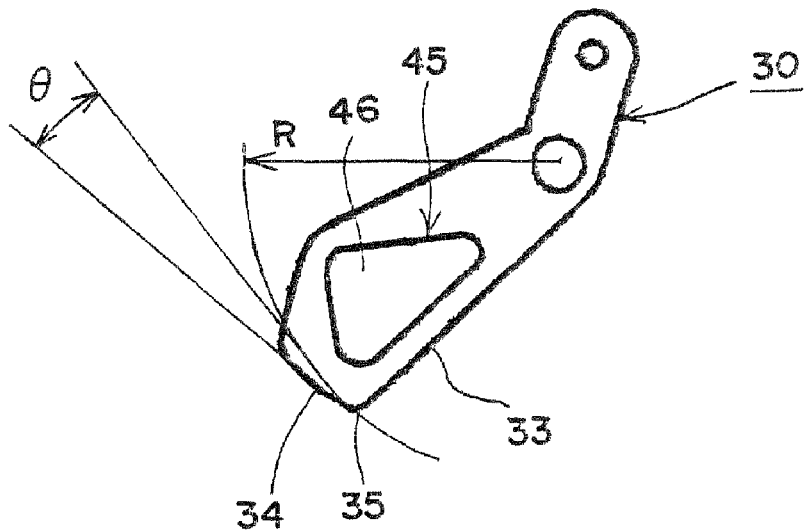
FIG. 4 is a side view of a looseness eliminating lever of the latch assembly.
Figure 5:
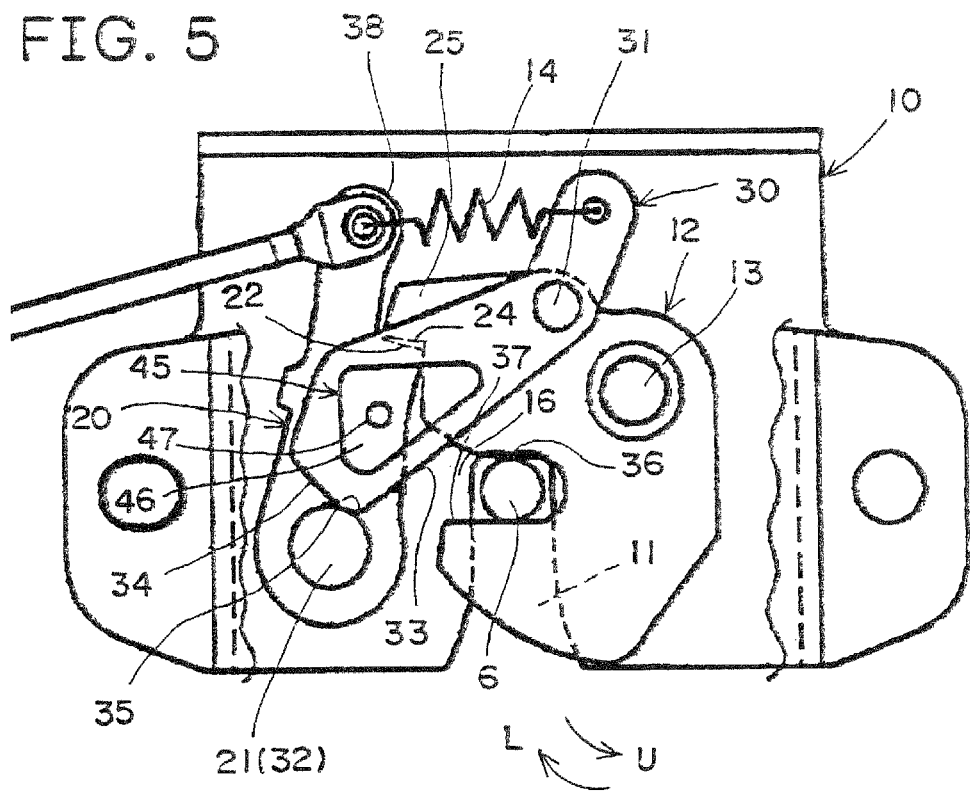
FIG. 5 is a side view of a normal latched state of the latch assembly.

The lever 30 has a latch holding face 34 consecutive to the unlatch face 33. An apex 35 is formed on the boundary of the latch holding face 34 and the unlatch face 33, and the latch holding face 34 is bent nearly at right angle to the unlatch face 33. The latch holding face 34 is formed in a curvature so that the distance from the pin 31 is longer from the start end (apex 35) to terminal end. As a result, as shown in FIG. 4, to the arc line R having the apex 35 around the pin 31, the terminal end of the latch holding face 34 is inclined like a wedge at an angle of ((preferably about 5 to 8 degrees).

When the latch 12 rotates from the unlatch position to the latch position, the pin 31 gradually departs from the post 32, and the latch holding face 34 of the lever 30 comes to contact with the post 32. In this state, the lever 30 being pressed in the counterclockwise direction by the elastic force of the spring 14 acts to move the pin 31 away from the post 32, and the latch 12 is biased toward the latch direction L. Accordingly, the striker 6 advances into the striker groove 11, and is guided toward a stopping face 36 at the innermost position of the striker groove 11 and the engagement between the latch 12 and the striker 6 is maintained by the lever 30.

In this manner, in the invention, when the latch holding face 34 contacts with the post 32, the latch 12 is rotated in the latch direction L until the striker 6 abuts against the stopping face 36 of the striker groove 11. As a result, the striker 6 is enclosed between a latch pressing face 37 which is one side wall of the striker engaging groove 16 of the latch 12 and the stopping face 36 of the base plate 10 tightly without allowing gap, and is held without looseness.

The apex 35 on the boundary of the unlatch face 33 and the latch holding face 34 is defined as a dead center of the spring 14, and when the unlatch face 33 is in contact with the post 32, the latch 12 is biased in the unlatch direction U, and when the latch holding face 34 is in contact with the post 32, the latch 12 is biased in the latch direction L.

Figure 3:
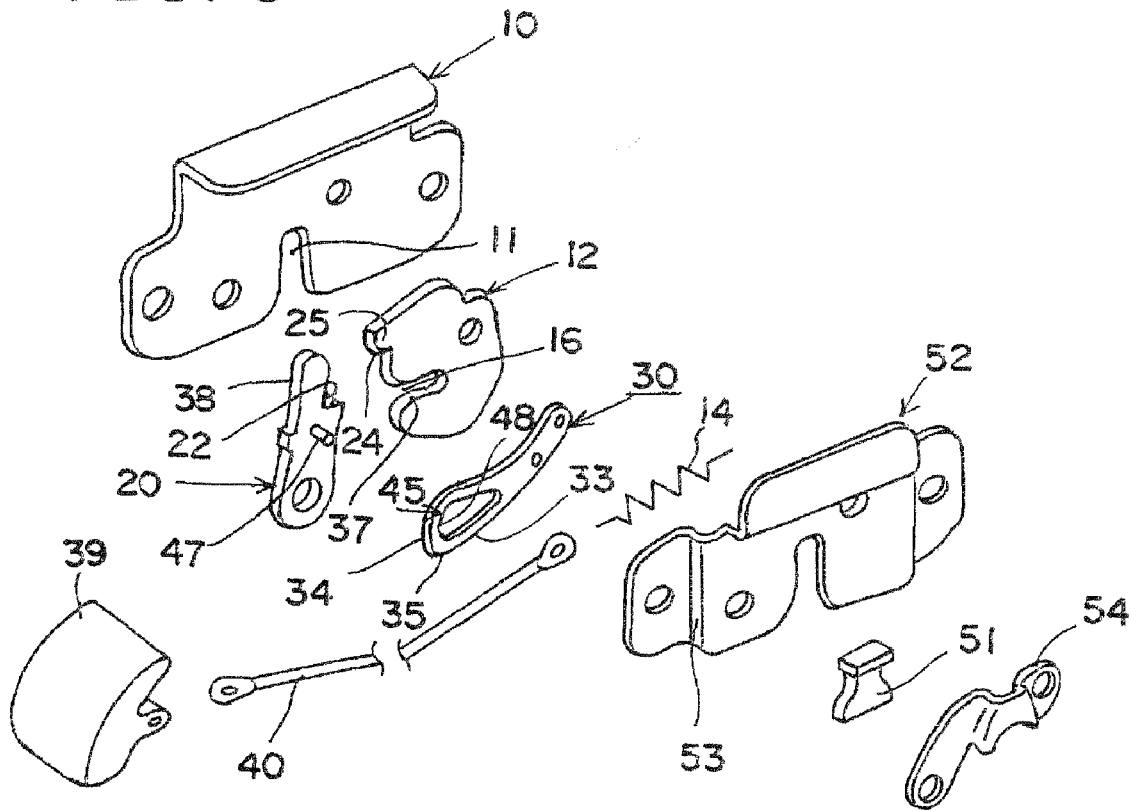
FIG. 3 is an exploded perspective view of the latch assembly.

An operation member 39 (FIG. 3) is coupled to the leading end 38 of the ratchet 20 by way of an operation transmission member 40 such as wire (rod).

The looseness eliminating lever 30 has a cam hole 46, and the ratchet 20 has a protrusion 47 to be engaged with the can hole 46. The cam hole 46 and the protrusion 47 are combined to constitute latch release means 45 for unlatching and rotating the latch 12. The engaging protrusion 47 is parallel to the axial center of the ratchet shaft 21.

The relation between the cam hole 46 and the protrusion 47 does not interfere with the rotation of the pawl 22 of the ratchet 20 in a direction to be engaged with the ratchet engaging face 24 of the latch 12. The inner circumference of the cam hole 46 is provided with a cam face 48 coming into sliding contact with the engaging protrusion 47. By the manipulation of the operation member 39, the ratchet 20 rotates counterclockwise, and the pawl 22 is released from the ratchet engaging face 24, so that the protrusion 47 abuts against the cam face 48 to rotate the looseness eliminating lever 30 clockwise, and thereby the latch holding face 34 is released from the post 32, and the latch 12 is free to rotate.

In the invention, the engagement between the latch 12 and the striker 6 is held by the engagement between the latch 12 and the looseness eliminating lever 30 as mentioned above. Therefore, the engagement holding of the latch 12 and the striker 6 by the engagement between the ratchet 20 and the latch 12 is an auxiliary action.

The leading end of the latch bump 25 of the latch 12 abuts against a side face 50 of the ratchet 20 in the unlatched state, and when the leading end of the latch bump 25 passes the pawl 22 of the ratchet 20, the pawl 22 may be engaged with the ratchet engaging face 24 of the latch 12.

The striker groove 11 is preferably provided with an elastic damper 53, and the stopping face 36 is formed at the downside of the elastic damper 51. The elastic damper is generally used in a latch device of a vehicle door, but in the case of a vehicle door, usually, a closed door is not further pushed in the closing direction, and the elastic damper is not compressed by an external force. In the case of a vehicle seat, on the other hand, when an occupant sits on the vehicle seat, the damper is compressed by the body weight of the occupant, and hence the position of the stopping face 36 formed at the downside of the elastic damper 51 is changed.

In the invention, when the position of the stopping, face 36 is changed in such situation, the latch 12 is rotated in the latch direction L by the portion of such change, and hence the looseness eliminating lever 30 is put in rotation, and thereby the latch 12 is held in the changed position. Therefore, the striker 6 is held between the latch 12 and the elastic damper 51 without allowing looseness.

Reference numeral 52 is a back plate, and in an unlatched state, the leading end of the looseness eliminating lever 30 abuts against a side face 53 of the back plate 52. Reference numeral 54 is a holder plate provided with the elastic damper 51.

The action will be described below.

When the latch assembly 5 of the vehicle seat 1 is engaged and latched with the striker 6 of the car body 4, the vehicle seat 1 is fixed to the car body 4, or when the engagement between the latch assembly 5 and the striker 6 is released to be unlatched, the vehicle seat 1 can be dismounted or moved.

The latch assembly 5 abuts against the inner circumference of the striker engaging groove 16 of the latch 12 when the striker 6 advances into the striker groove 11 of the base plate 10 in an unlatched state in FIG. 10, and the latch 12 rotates in the latch direction L. The leading end of the latch bump 25 of the latch 12 abuts against the side face 50 of the ratchet 20, and the ratchet 20 is biased to fit elastically to the outer circumference of the latch 12 by the spring 14. Thus, when the leading end of the latch bump 25 passes the pawl 22 of the ratchet 20, the pawl 22 is engaged with the ratchet engaging face 24 of the latch 12.

When the pawl 22 of the ratchet 20 is engaged with the ratchet engaging face 24, the rotation of the latch 12 in the unlatch direction is regulated, and the striker engaging groove 16 of the latch 12 and the striker 6 are engaged and held.

The latch 12 is provided with the looseness eliminating lever 30 by means of the pin 31, and the end of the looseness eliminating lever 30 has the latch holding face 34 inclined like a wedge at an angle of ((preferably about 5 to 8 degrees) at the terminal end to the arc line R centered on the pin 31. Therefore, when the latch holding face 34 abuts against the post 32, the pin 31 rotates clockwise around the latch shaft 13.

Hence, after the striker 6 is engaged with the striker engaging groove 16 of the latch 12, the latch 12 is further rotated so that the striker 6 may move toward the innermost position in the striker groove 11.

As a result, the striker 6 advances in the striker groove 11 until hitting against the stopping face 36 of the base plate 10, and the latch 12 is rotated until the striker 6 hits against the stopping face 36 and is stopped.

When the striker 6 stops by hitting against the stopping face 36, the rotation of the latch 12 in the latch direction L is stopped.

Since the looseness eliminating lever 30 is always biased by the spring 14, the striker 6 is engaged and held without allowing a gap between the latch pressing face 37 of the striker engaging groove 16 of the latch 12 and the stopping face 36 of the base plate 10, and the striker 6 and latch 12 do not return to the original position, and hence noise is not generated. Therefore, since the striker 6 is held without a gap from above and beneath, noise caused by vertical movement does not occur unlike the conventional striker 6.

Figure 6:
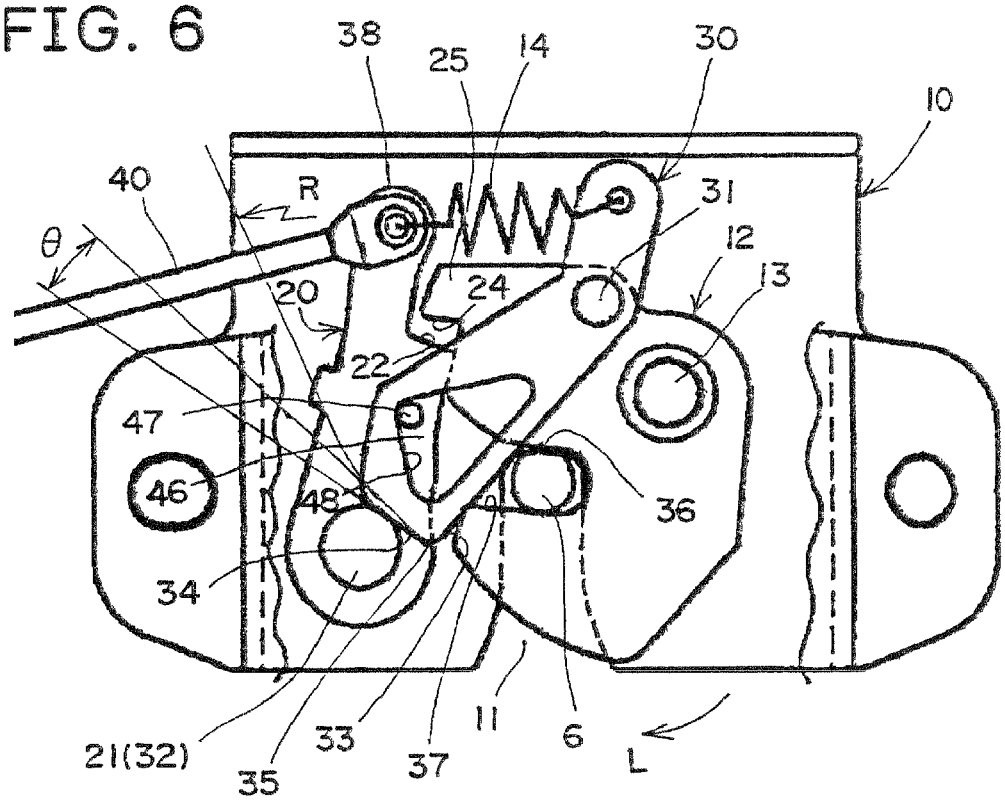
FIG. 6 is a side view showing a state of the looseness eliminating lever pushing the latch in latch direction from the state in FIG. 5.

Similarly, even if the diameter of the striker 6 is smaller than specified due to a manufacturing error, as shown in FIG. 6, the striker 6 is engaged and held between the latch pressing face 37 and the stopping face 36 without a gap, and looseness is prevented. At this time, by the portion of rotation of the latch 12 in the latch direction L, a gap is produced between the pawl 22 and the ratchet engaging face 24.

Figure 7:
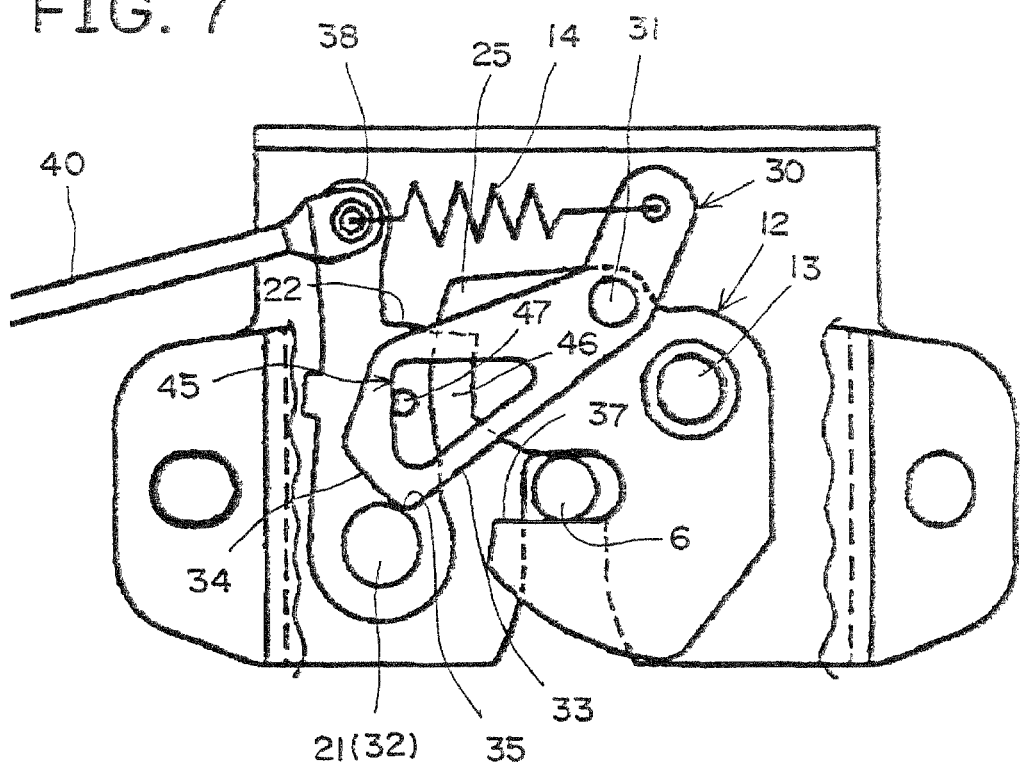
FIG. 7 is a side view of a ratchet of the latch assembly operated in a door opening state.
Figure 8:
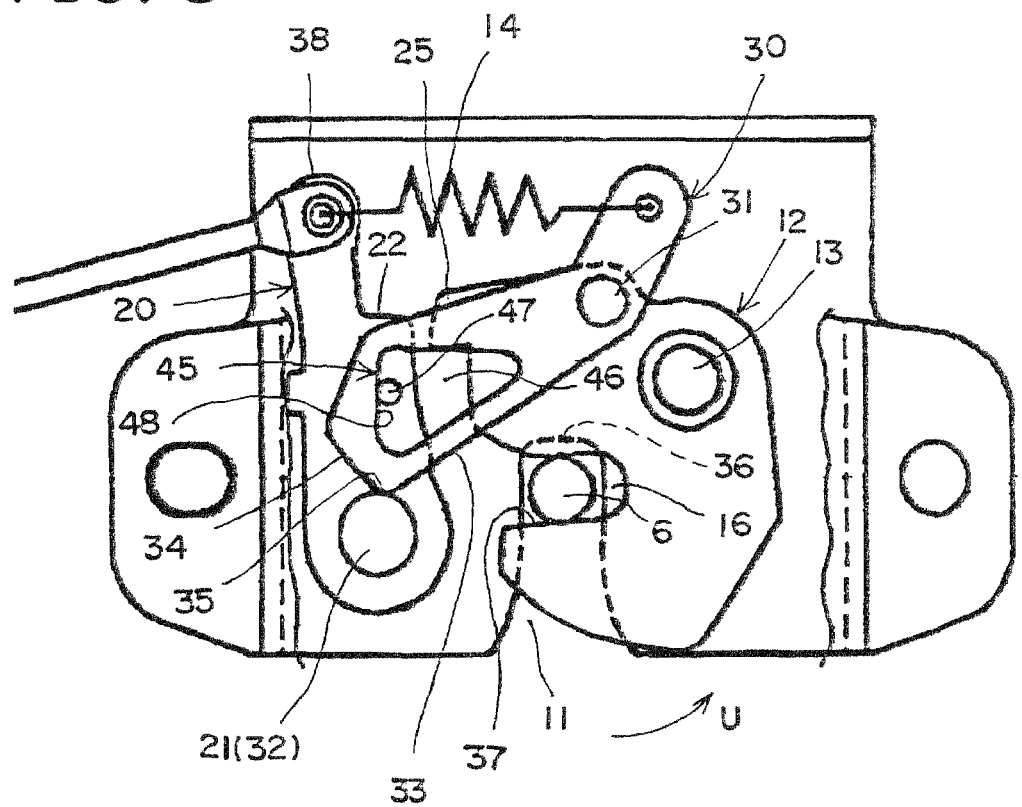
FIG. 8 is a side view of the latch released from a pawl of the ratchet from the state in FIG. 7.

In the latched state shown in FIG. 2 or 6, when an operation wire unlatch face 33 is pulled, the ratchet 20 is rotated in counterclockwise direction around the ratchet shaft 21 (FIG. 7), and the pawl 22 of the ratchet 20 is released from the ratchet engaging face 24 of the latch 12 (FIG. 8). As a result, the latch 12 instantly rotates in the unlatch direction U, and the striker 6 is released.

When the pawl 22 of the ratchet 20 is released from the ratchet engaging face 24 of the latch 12, and the latch 12 is put in rotation, the guide face of the latch bump 25 of the latch 12 abuts against the side face of the ratchet 20, and the rotation of the ratchet 20 in the latch direction is blocked. Thus, mechanical latching is prevented, and a waiting state is established.

When the pawl 22 of the ratchet 20 is released from the ratchet engaging face 24 of the latch 12 (FIGS. 7 to 9), the latch holding face 34 of the looseness eliminating lever 30 passes through the post 32, and the unlatch face 33 comes in sliding contact with the post 32. Thus, the unlatch preventive state of the latch 12 by the looseness eliminating lever 30 is released, and the rotation of the latch 12 in the unlatch direction U is not disturbed (the engaging protrusion 47 pushes the cam face 48, and releases the looseness eliminating lever 30, after which the latch 12 is put in rotation).

Figure 9:
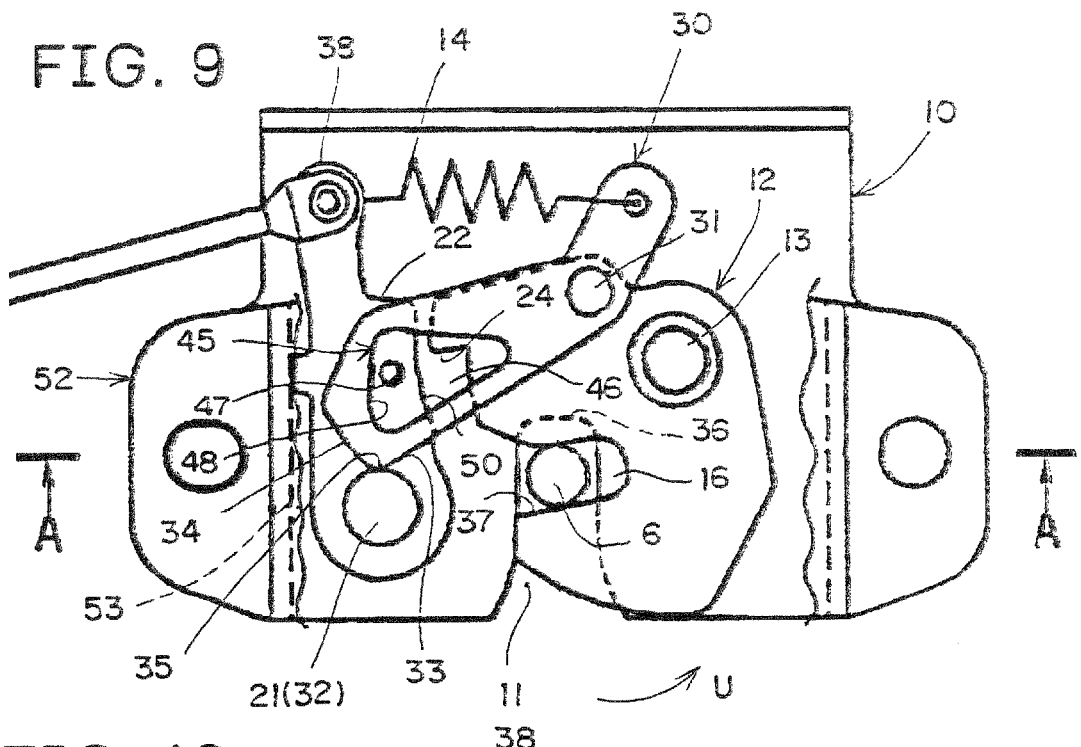
FIG. 9 is a side view showing a state immediately before a latch holding surface of the looseness elimination level is released from a post.

That is, when the ratchet 20 rotates counterclockwise, the engaging protrusion 47 of the ratchet shaft 21 abuts against the cam face 48 of the cam hole 46 of the looseness eliminating lever 30. By the action of the engaging protrusion 47 and the cam face 48, the latch holding face 34 is released from the post 32, and when the apex 35 rides over and passes the post 32, it surpasses the dead center, in other words, to remove the barrier between the post 32 and the pin 31, so that the unlatch face 33 slides on the post 32. As a result, the pin 31, together with the latch 12, rotates counterclockwise around the latch shaft 13, and the latch 12 rotates in the unlatch direction U for releasing the striker 6 (FIGS. 9 and 10).

In this case, the spring 14 acts to move the looseness eliminating lever 30 so that the pin 31 may rotate always in the unlatch direction U around the latch shaft 13, from the fulcrum of the contacting portion of the post 32 and unlatch face 33. Thus, the spring 14 acts to rotate the latch 12 always in the unlatch direction U by way of the looseness eliminating lever 30.

Since the other end of the spring 14 is stopped at the leading end 38 of the ratchet 20, the pawl 22 of the ratchet 20 is always biased in the latch direction to be engaged with the latch 12. Therefore, the spring 14 acting on the latch 12, ratchet 20, and looseness eliminating lever 30 is realized by only one spring, and hence the operation member 39 can be manipulated with a small effort.

The striker 6 is provided in the car body 4, but for the ease of understanding, it is removed relatively to the latch assembly 5, and the direction such as vertical or front-back direction is mentioned, but the invention is not limited by these descriptions alone.

In the invention, after the striker 6 is engaged with the latch 12, by the action of the looseness eliminating lever 30, the latch 12 is rotated in the latch direction and is contracted. Thus, looseness or instability of the seat can be prevented, and the striker 6 and latch 12 do not return to the original position, and hence noise is not generated.

The invention prevents looseness and instability of the seat.

The invention prevents unlatching by double safety by the looseness eliminating lever 30 aside from the latch 12 and ratchet 20.

The invention can be simplified in structure.

In the invention, by one spring 14 only, the latch 12, the ratchet 20, and the looseness eliminating lever 30 can be always biased in a specified direction individually, and the effort for manipulating the unlatch operation can be lessened. The number of parts is reduced, thereby contributing to reduction in weight and cost.

The invention claimed is:

1. A latch device for a vehicle seat having a latch assembly for fixing, to a car body, a vehicle seat which is movably provided on the car body, said latch assembly comprising:
    a base plate having a striker groove for receiving a striker;
    a latch rotatably mounted on the base plate via a latch shaft and having a striker engaging groove to be engaged with the striker in a latched position;
    a ratchet rotatably mounted on the base plate via a ratchet shaft and comprising a pawl for engaging the latch in the latched position and preventing rotation of the latch in an unlatch direction; and
    a looseness eliminating lever rotatably attached to the latch by means of a pin;
    wherein one end of the looseness eliminating lever is provided with a latch holding face and an unlatch face adapted to contact with the ratchet shaft;
    wherein the other end of the looseness eliminating lever is engaged with a spring connected with the ratchet for biasing the latch holding face or the unlatch face to be always in contact with the ratchet shaft and for rotating the latch in the unlatch direction when the ratchet is rotated such that the pawl is released from the latch;
    wherein an apex as a dead center is formed between the latch holding face and the unlatch face;
    wherein the latch holding face is formed in an arc-shaped inclined surface so as to be remoter from the pin from a start end to a terminal end;
    wherein the looseness eliminating lever is provided with a cam hole having a cam face, an engaging protrusion formed on the ratchet is fit into the cam hole, and when the ratchet is rotated in a direction such that the pawl is released from the latch, the engaging protrusion comes in sliding contact with the cam face, and the looseness eliminating lever acts to release the latch holding face from the ratchet shaft, so that the unlatch face, replacing the latch holding face, comes in sliding contact with the ratchet shaft.

2. The latch device for a vehicle seat according to claim 1, wherein the striker is engaged and held between a latch pressing face at the inner circumference of the striker engaging groove of the latch and a stopping face of the base plate at the innermost position in the striker groove without allowing a gap.

3. A latch device for a vehicle seat having a latch assembly for fixing, to a car body, a vehicle seat which is movably provided on the car body, said latch assembly comprising:

a base plate having a striker groove for receiving a striker;

a latch rotatably mounted on the base plate via a latch shaft and having a striker engaging groove to be engaged with the striker in a latched position;

a ratchet rotatably mounted on the base plate via a ratchet shaft and comprising a pawl for engaging the latch in the latched position and preventing rotation of the latch in an unlatch direction; and a looseness eliminating lever rotatably attached to the latch by means of a pin;

wherein one end of the looseness eliminating lever is provided with a latch holding face and an unlatch face adapted to contact with the ratchet shaft;

wherein the other end of the looseness eliminating lever is engaged with a spring connected with the ratchet for biasing the latch holding face or the unlatch face to be always in contact with the ratchet shaft and for rotating the latch in the unlatch direction when the ratchet is rotated such that the pawl is released from the latch;

wherein an apex as a dead center is formed between the latch holding face and the unlatch face;

wherein the latch holding face is formed in an arc-shaped inclined surface so as to be remoter from the pin from a start end to a terminal end;

wherein when the ratchet is rotated in a direction such that the pawl is released from the latch, the looseness eliminating lever acts to release the latch holding face from the ratchet shaft, so that the unlatch face comes in sliding contact with the ratchet shaft;

wherein an end of the spring is engaged with a leading end of the ratchet, and the leading end is coupled with an end of an operation transmission member coupled to an operation member at one end.

4. The latch device for a vehicle seat according to claim 3, wherein the striker is engaged and held between a latch pressing face at the inner circumference of the striker engaging groove of the latch and a stopping face of the base plate at the innermost position in the striker groove without allowing a gap.

* * * * *